US005777405A

United States Patent [19]

Kurozumi et al.

[11] Patent Number: 5,777,405

[45] Date of Patent: *Jul. 7, 1998

[54] DAMPING MEMBER FOR MINIMOTOR AND MINIMOTOR EQUIPPED WITH THE SAME

[75] Inventors: Seiji Kurozumi; Yukio Honda, both of Osaku-fu; Kazuaki Sato, Tottori-ken; Masao Nakamura, Saitama-ken; Nobuharu Suzuki, Saitama-ken; Tokio Fujita, Saitama-ken; Hitoshi Matsuoka, Gunma-ken, all of Japan

[73] Assignees: Matsushita Electric Industrial Co., Ltd.; Nitto Denko Corporation, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 538,803

[22] Filed: Oct. 3, 1995

[30] Foreign Application Priority Data

Oct. 5, 1994 [JP] Japan .................................... 6-241242

[51] Int. Cl.$^6$ ................................ H02K 5/24; B32B 5/16

[52] U.S. Cl. .................... 310/40 MM; 310/51; 310/244; 310/248; 310/251; 428/327; 428/461

[58] Field of Search ................................ 310/51, 40 MM, 310/244, 248, 251, 252; 117/72, 75, 63; 524/493; 428/355, 327, 522, 520, 521

[56] References Cited

U.S. PATENT DOCUMENTS

| | | | |
|---|---|---|---|
| 3,658,635 | 4/1972 | Eustice | 161/190 |
| 3,833,404 | 9/1974 | Sperling et al. | 117/63 |
| 3,983,297 | 9/1976 | Ono et al. | 428/355 |
| 4,626,567 | 12/1986 | Chang | 524/493 |
| 4,758,757 | 7/1988 | Okumura | 310/244 |
| 4,843,272 | 6/1989 | Mabuchi | 310/239 |
| 5,118,562 | 6/1992 | Johnson et al. | 428/327 |

FOREIGN PATENT DOCUMENTS

| | | |
|---|---|---|
| 542201A | 5/1993 | European Pat. Off. . |
| 50-144009 | 11/1975 | Japan . |
| 62-226463 | 3/1986 | Japan . |
| 63-189239 | 2/1987 | Japan . |
| 63-193977 | 2/1987 | Japan . |
| 10-69336A | 3/1989 | Japan . |
| 4-279328 | 3/1991 | Japan . |

*Primary Examiner*—Steven L. Stephan
*Assistant Examiner*—Tran N. Nguyen
*Attorney, Agent, or Firm*—Wenderoth, Lind & Ponack

[57] ABSTRACT

The present invention provides a damping member constituted of a viscoelastic member and a constraint member, each of which is formed on a brush made of thin metal plate, in a dc minimotor, the viscoelastic member comprising adhesive mass containing a copolymer of alkyl acrylate and acrylic acid. The present invention further provides a brush constituted of the above damping member and a dc minimotor equipped with the brush.

2 Claims, 4 Drawing Sheets

Fig.3
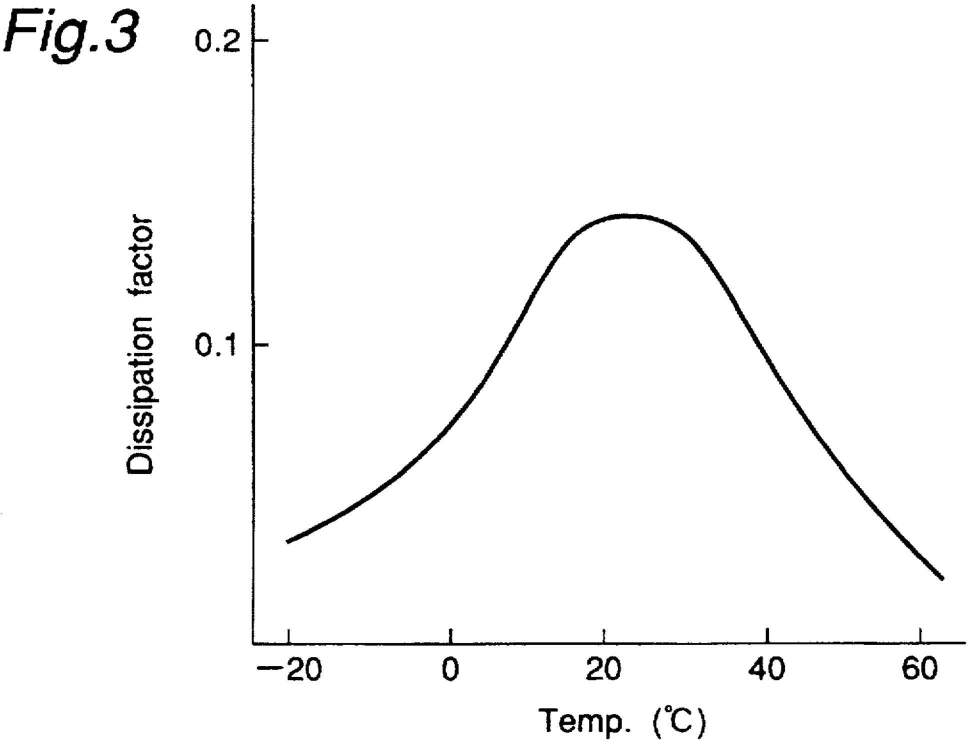
Fig.4A
Fig.4B
Fig.4C
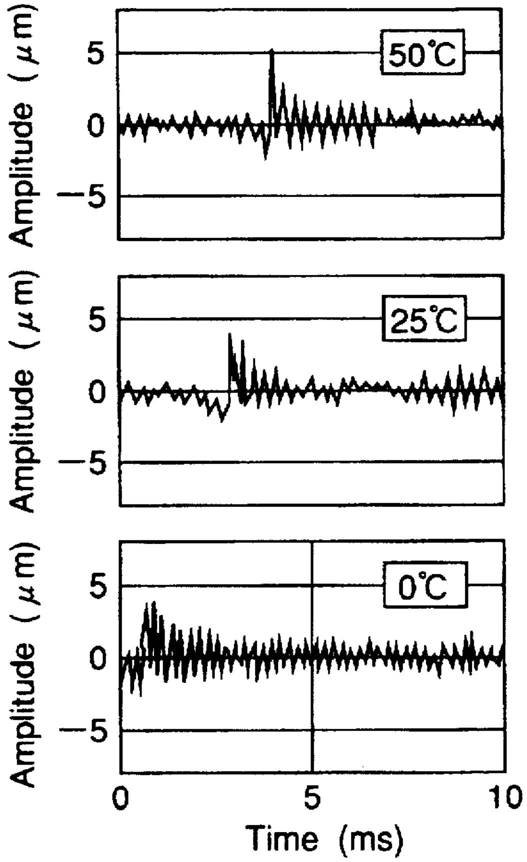

| | Damping properties | A | B | C | D |
|---|---|---|---|---|---|
| Ex.1 |  | ○ | ◎ | ◎ | ○ |
| Ex.2 |  | ○ | ○ | ○ | ○ |
| Ex.3 |  | ○ | ◎ | ◎ | ○ |
| Ex.4 |  | ○ | ○ | ○ | ○ |
| Ex.5 |  | ○ | ○ | ○ | ○ |

A: Life test.
○: Very good, Δ: Good, ×: Poor

B: Adhesion.
◎: Excellent, ○: Very good, Δ: Good, ×: Poor

C: Punchability. (Glue squeeze-out).
◎: Almost none, ○: A little observed, Δ: Observed, ×: Remarkable D: Total properties.
○: Very good, Δ: Good, ×: Poor

| | Damping properties | A | B | C | D |
|---|---|---|---|---|---|
| Comparative ex.6 |  | × | △ | △ | × |
| Comparative ex.7 |  | × | × | ◎ | × |
| Comparative ex.8 |  | △ | △ | △ | × |
| Comparative ex.9 |  | × | ◎ | △ | △ |

A: Life test.
O: Very good, △: Good, ×: Poor

B: Adhesion.
◎: Excellent, O: Very good, △: Good, ×: Poor

C: Punchability. (Glue squeeze-out).
◎: Almost none, O: A little observed, △: Observed, ×: Remarkable D: Total properties.
O: Very good, △: Good, ×: Poor

DAMPING MEMBER FOR MINIMOTOR AND MINIMOTOR EQUIPPED WITH THE SAME

BACKGROUND OF THE INVENTION

1. Field of the Invention

The present invention relates to a dc motor constituted of a brush formed of thin metal plate and a commutator sliding on the brush. In particular, the present invention provides to a damping member for restraining vibration of metal brush, a brush equipped with the damping member and a minimotor equipped with the brush.

2. Description of the Prior Art

A metal brush is pressed against a commutator in order to provide rectification properties for a dc minimotor. Such a metal brush is formed of electrically conductive materials, such as a beryllium thin plate, a copper alloy thin plate, and has a contact portion formed of noble metals and brought into contact with the commutator. Explanation is made hereinafter by referring to FIG. 1 for easy understanding.

In general, a brush 6 for a minimotor is constituted of a brush-supporting member 2, a basic brush component 1 supported by the supporting member 2 and a contact part 3 formed in the basic brush component 1. The brush 6 is brought into contact with the commutator 5 in such a condition that the contact part 3 is pressed against a commutator segment 4 under stress generated by bending the basic brush component 1.

When the motor is driven, the commutator 5 revolves as the motor revolves. Therefore, when the brush 6 slides between the commutator segments 4, the brush vibrates. The vibration of brush makes the contact pressure between brush and commutator alter, so that mechanical wear of brush and commutator is promoted.

Further, the contact between the brush 6 and the commutator segments becomes unstable, and electrical sparks generate between the brush 6 and the commutator 5, so that electrical wear of the brush and the commutator is also increased.

It has been proposed that a damping member be provided for the brush basic component 1 in order to restrain the above undesired vibration. For example, Japanese Patent Laid-Open No. Sho 50-144009 proposes that a viscoelastic layer formed of a mixture of heat resistant resin and rubber-like elastomer be applied to the damping member.

However, when the damping member formed of a conventional viscoelastic layer is applied to a dc minimotor, the life of the motor is extremely shortened at a high temperature of 40° C. or more and at a low temperature of 0° C. or less, compared with the time when used at a temperature around room temperature (25° C.). There is therefore a very large difference the life of the motor, depending very much on the environmental temperature.

SUMMARY OF THE INVENTION

The object of the present invention is to provide a damping member which can provide a brush for a high vibration-reducing property at a wide range of temperatures at which a motor is used, and which can effectively restrain the vibration of the brush.

Another object of the present invention is to further provide a brush constituted of the above damping member and a dc minimotor equipped with the brush.

BRIEF DESCRIPTION OF THE DRAWINGS

FIG. 3 is a graph illustrating the dissipation factor vs. temperature, resulting from use of a conventional damping member.

FIGS. 4A, 4B and 4C show a graph of the waveform of the vibration of a brush in order to explain the relationship between the temperature properties and the vibration of the brush, resulting from the use of a conventional damping member.

DETAILED DESCRIPTION OF THE INVENTION

Figure 1:
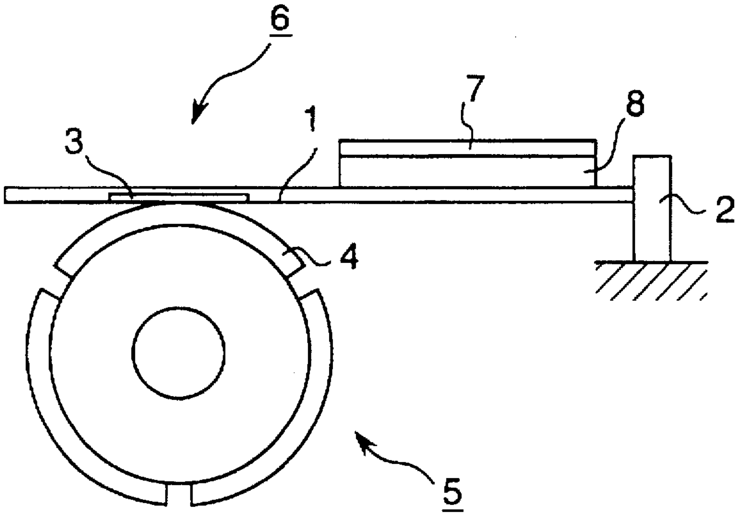
FIG. 1 is a schematic block diagram of a brush and commutator.

The present invention relates to a damping member formed of a viscoelastic member and a constraint member on a brush made of a thin metal plate, the viscoelastic member being formed of an adhesive mass containing a copolymer of alkyl acrylate and acrylic acid. The present invention further relates to a brush constituted of the above damping member and a dc minimotor equipped with the brush.

The damping member has a basic constitution in which a viscoelastic member 8 and a constraint member 7 are laminated in the.order on a basic brush component 1 formed of an elastic and electrically conductive thin plate made of alloy of beryllium and copper, phosphor bronze, etc. The damping member is used in such a way that a contact part 3, formed of noble meals such as Ag, Pd, Cu, Pt, Au, Zn, Cd and Ni in the basic brush component 1, is brought into contact with a commutator 5.

In the present invention, the viscoelastic member applied to the damping member is formed of an adhesive mass containing a copolymer of an alkyl acrylate represented by the general formula: $CH_2{=}CHCOOR$ in which R represents an alkyl group having 8–12 carbon atoms and an acrylic acid represented by the chemical formula: $CH_2{=}CHCOOH$.

The use of such a viscoelastic member gives a stable dissipation factor at a wide range of temperature at which the motor is used. The dissipation factor is a barometer of the vibration-damping ability of a damping member to convert vibrational energy to heat energy by the deformation of the viscoelastic member and the molecular vibration of the viscoelastic material. A value of 0.1 or more, preferably 0.12 or more in the dissipation factor is needed within the range of temperature at which the motor is used.

The present invention can achieve a stable dissipation factor of 0.1 or more within the wide range of temperature of 0°–40° C. Therefore, the vibration of brush in motor is restrained to reduce the wear of the brush, so that the life of motor can be lengthened and the performance of motor is enhanced.

Figure 2:
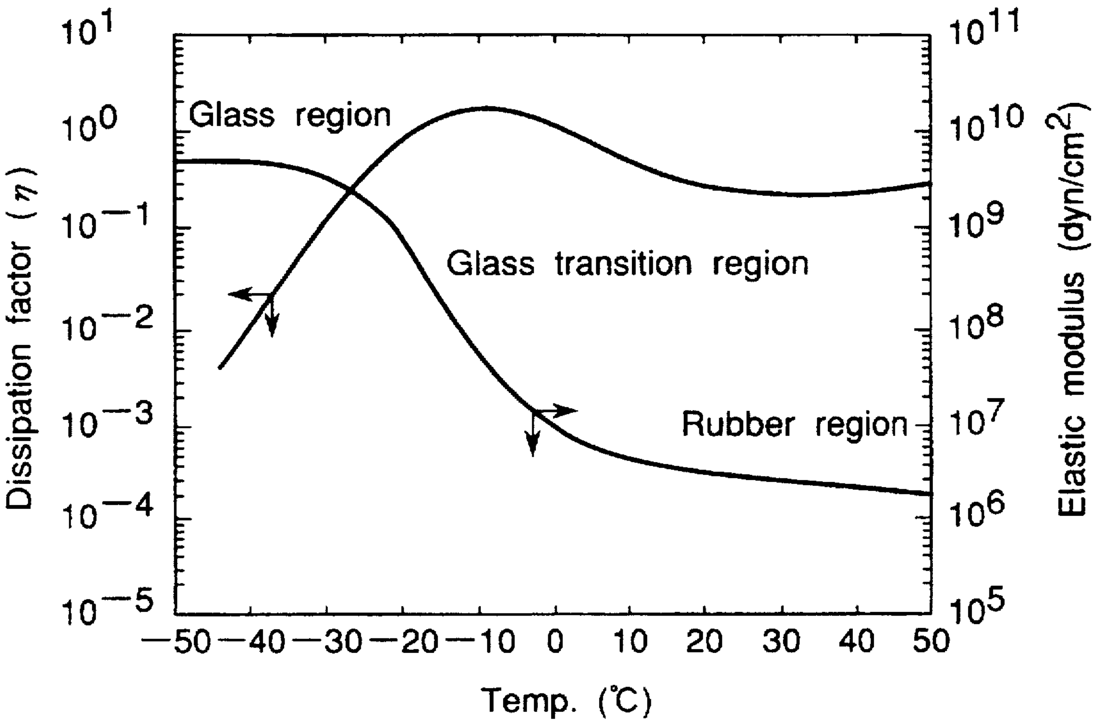
FIG. 2 is a graph of the dissipation factor vs. temperature in order to explain the relationship between the temperature properties and the vibration of the brush, which results from the use of the damping member of the present invention.

The alkyl group in the alkyl acrylate is desirably a long-chain alkyl group having 8–12 carbon atoms, preferably 8–10 carbon atoms. The dissipation factor has a maximal value in a glass transition area where elasticity modulus of polymer elastic material changes much, as shown in FIG. 2. Therefore, it is preferable to use a polymeric viscoelastic material having a wide glass transition area and showing a slow change in elasticity modulus in order to obtain a damping member exhibiting a stable damping properties in a wide temperature range.

From the above-mention viewpoint, the alkyl group in the present invention is indicated as having a specified number of carbon atoms. If the carbon number of alkyl group decreases, the glass transition region becomes narrow. If the carbon number of the alkyl group increases, adhesion is lowered, and the dissipation factor becomes small.

The copolymer constituting the viscoelastic member is comprised of 82–92 percent by weight of an alkyl acrylate and 8–18 percent by weight of an acrylic acid. If the weight ratio of acrylic acid becomes large, the glass transition region moves toward a high temperature, and the performance of the damping member becomes poor at low temperatures. If the weight ratio becomes small, the adhesion is lowered and the dissipation factor becomes small. Therefore, the weight ratio of the acrylic acid is 18–8 percent by weight, preferably 15–10 percent by weight.

The copolymer of alkyl acrylate and acrylic acid may be prepared by photopolymerization, bulk-polymerization and any other known polymerization of the monomers by use of radical polymerization initiators. Examples of polymerization inhibitors are azobisisobutyronitrile, benzoyl peroxide, lauroyl peroxide, such as methyl ethyl ketone peroxide, or photopolymerization initiators, such as 1-hydroxycyclohexyl phenyl ketone, benzyl dimethyl ketal and benzophenone. The final copolymer, however, is prepared so that the copolymer may have a content of insoluble matter of 60% or more, preferably 68–98% as explained below. Thus prepared copolymer displays pressure sensitive adhesive properties. If the content of insoluble matter is too high, the pressure adhesive properties can not be obtained. If the content is less than 60%, punchability becomes poor.

The content of insoluble matter is given as follows. The copolymer is cut out as a sample. The sample is dipped in isopropyl alcohol at room temperature for 5 days. Then the sample is picked up by tweezers to place it into an aluminium cup. The sample is dried at 130° C. for 2 hours. After drying, the content of the insoluble matter is calculated according to the following formula on the basis of the change of weight of the sample.

$$\text{The content of isoluble matter (wt \%)} = \frac{\text{The weight of the dipped and dried sample (g)}}{\text{The weight of the sample (g)}} \times 100$$

The content of insoluble matter can be adjusted by adding to the obtained copolymer a crosslinking agent having isocyanate groups, epoxy groups and the like, such as diphenylmethane diisocyanate, toluylene diisocyanate and 1,3-bis(N,N-diglycidylaminomethyl)cyclohexane.

In another method, when the copolymer is prepared, a polyfunctional monomer, such as trimethylolpropane triacrylate and pentaerythritol acrylate, is added to the monomer mixture as an internal cross linking agent. The resultant monomer mixture containing the internal cross linking agent is irradiated by ultraviolet rays or electron rays to be bulk-polymerized.

Such a cross linking agent is added at an amount of 0.3–5 percent by weight, preferably 0.6–2 percent by weight on the basis of the total weight of the alkyl acrylate and acrylic acid. If the content is higher than 5 percent by weight, the coefficient of elasticity of the polymer becomes so high that adhesion is lowered. If the content is lower than 0.3 percent by weight, sufficient cross linking can not be achieved and punchability becomes poor.

A mixture of the above prepared copolymer of alkyl acrylate and acrylic acid with the crosslinking agent is applied to a base by a painter's tool and cured by heat to give a sheet-like viscoelastic member.

In the case of monomer mixture containing the internal cross linking agent, the monomer mixture is applied to a base and then is bulk-polymerized by ultraviolet rays or electron rays to form a sheet-like viscoelastic member.

The viscoelastic member is formed in such a way that the thickness of the member is 50–200 μm, preferably 75–150 μm. If the thickness is thicker than 200 μm, the weight of the damping member is increased so as to deteriorate the follow-up properties of the brush on the surface of the commutator. If the thickness is thinner than 50 μm, the dissipation factor becomes small resulting in the deterioration of the damping properties.

The viscoelastic member may be formed by coating directly a brush with a polymer of an alkyl acrylate and acrylic acid.

The constraint member is laminated on one side of the viscoelastic member formed on a base. The damping member having a specified form is cut out from the laminated base. As the viscoelastic member has adhesion properties, the constraint member can be just put on the viscoelastic member in order to adhere the constraint member to the viscoelastic member. The adhered side of the constraint member may be treated with primer or alkali metal. Thereby, the adhesion can be ensured by pressing the constraint member by taking advantage of the pressure sensitive properties of the viscoelastic member.

The constraint member used in the present invention is formed of a polyester film, a polyimide film, a polyethylene film or a polyimide film and the like having a thickness of 20–90 μm, preferably 35–75 μm.

The damping member is formed so that the total thickness of the viscoelastic member and the constraint member may be 75–250 μm, preferably 100–200 μm. If the thickness is larger than 250 μm, the weight of the damping member is increased, thereby deteriorating the to the follow-up properties of the brush on the surface of a commutator. If the thickness is thinner than 50 μm, the dissipation factor becomes small resulting in the deterioration of the damping properties.

The damping member may be attached to both sides of brush except for the contact part between brush and commutator. The one-side attachment of the damping member works to give the effects of the present invention by adjusting the thickness of the damping member.

When the damping member of the present invention as obtained above is applied to a motor, the following effects can be obtained.

(1) It becomes possible to restrain the undesired vibration of the brush in a wide range of temperatures, whereby the wear of the brush can be reduced, resulting in a long life for the minimotor.

(2) The contact between the brush and the commutator becomes stable and current wave also becomes stable. Therefore it is possible to provide a high-quality motor displaying little wow and flutter.

(3) Undesired vibration of the brush is decreased and the sparking voltage can be restrained. Therefore it is possible to provide a motor with low noise and low electromagnetic noise.

Examples are shown hereinafter to explain the present invention in more detail.

Examples 1–3 and Comparative Examples 7–8

An acrylic acid monomer was mixed with an alkyl acrylate monomer under nitrogen atmosphere according to monomer species and composition ratio by weight as shown in Table 1 . 1-hydroxycyclohexyl phenyl ketone and trimethylolpropane triacrylate (photopolymerizable polyfunctional acrylate) were added to the monomer mixture as a photopolymerization initiator. The resultant mixture was irradiated for polymerization by ultraviolet rays emitted from a high pressure mercury lamp at 1400 $J/cm^2$. Thus, a sheet of adhesive mass composition containing insoluble mass as shown in Table 1.

The content of insoluble matter was adjusted by an amount of the cross linking agent.

A polyester film having a thickness of 50 μm was laminated on and adhered to the above obtained sheet. The obtained film was punched and adhered to a basic brush component attached in a minimotor.

TABLE 1

| | viscoelastic member | carbon number of R | weight ratio of A:B | insoluble matter (%) |
|---|---|---|---|---|
| Example 1 | pressure sensitive adhesive containing copolymer of acrylic acid and alkyl acrylate | 8 | 15:85 | 93 |
| Example 2 | pressure sensitive adhesive containing copolymer of acrylic acid and alkyl acrylate | 10 | 10:90 | 89 |
| Example 3 | pressure sensitive adhesive containing copolymer of acrylic acid and alkyl acrylate | 10 | 15:85 | 98 |
| Example 4 | pressure sensitive adhesive containing copolymer of acrylic acid and alkyl acrylate | 9 | 10:90 | 86 |
| Example 5 | pressure sensitive adhesive containing copolymer of acrylic acid and alkyl acrylate | 10 | 10:90 | 68 |
| Comparative Example 6 | pressure sensitive adhesive containing copolymer of acrylic acid and alkyl acrylate | 4 | 10:90 | 75 |
| Comparative Example 7 | pressure sensitive adhesive containing copolymer of acrylic acid and alkyl acrylate | 10 | 20:80 | 92 |
| Comparative Example 8 | pressure sensitive adhesive containing copolymer of acrylic acid and alkyl acrylate | 8 | 5:95 | 88 |
| Comparative Example 9 | adhesive of natural rubber | — | | |

A: $CH_2{=}CHCOOH$
B: $CH_2{=}CHCOOR$ (R is an alkyl group)

Examples 4–5 and Comparative Example 6

An acrylic acid monomer was mixed with an alkyl acrylate monomer according to the monomer species and composition ratio by weight as shown in Table 1. Azobisisobutyronitrile was added to the monomer mixture as an initiator. Polymerization was carried out in an ethyl acetate solvent. 1,3-bis(N,N-diglycidylaminomethyl)-cyclohexane was added to the obtained polymer as a crosslinking agent. The resultant was applied to give a sheet of adhesive mass composition.

A minimotor was obtained in a manner similar to Example 1.

Comparative Example 9

Polyester film of 50 μm thickness was adhered as a constraint member to a double-sided adhesive tape available in the market as No. 513 (made by Nitto Denko K.K., rubber-like adhesive mass; paper base). Thus, the obtained damping member was attached to a minimotor.

Figure 5:
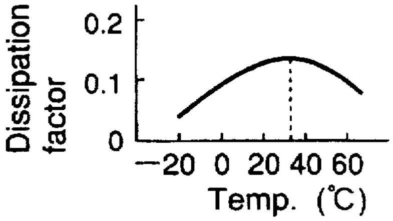
FIG. 5 shows the evaluations of the damping members attached to the motors obtained in the Examples.
Figure 5:
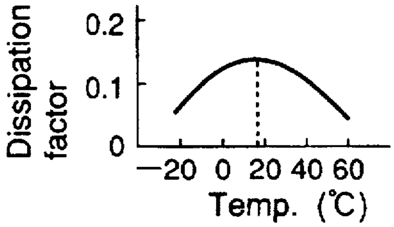
Figure 5:
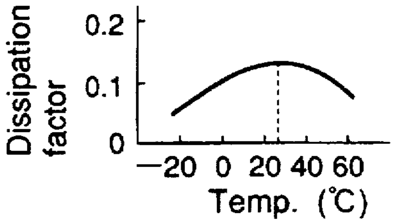
Figure 5:
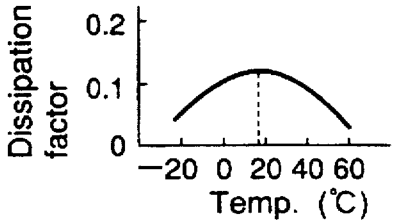
Figure 5:
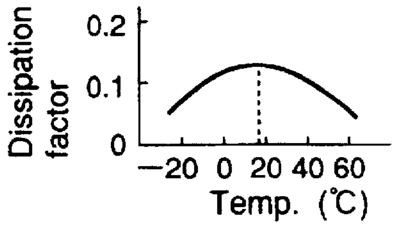
Figure 6:
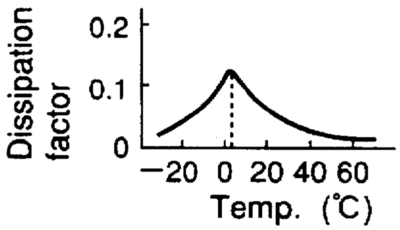
FIG. 6 shows the evaluations of the damping members attached to the motors obtained in the Comparative Examples.
Figure 6:
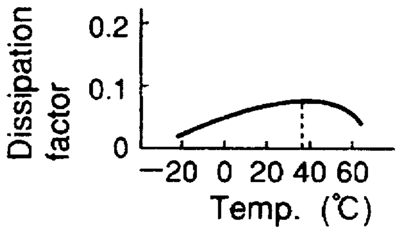
Figure 6:
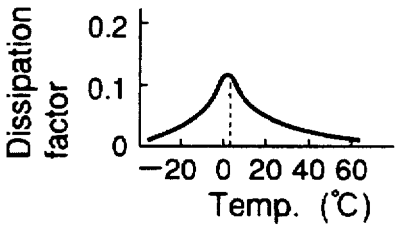
Figure 6:
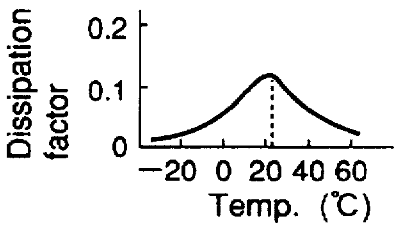

The motors obtained in the above Examples and Comparative Examples were operated to evaluate the damping members attached to the motors. An evaluation was made on the damping properties, the practical life, the adhesive properties, the punching properties and overall properties. The results were summarized in FIG. 5 and FIG. 6. The concrete running conditions of each evaluation item are explained below.

The damping properties were evaluated on the basis of the dissipation factor at resonant frequency according to the half-width method, in which each damping member is adhered to a basic brush component and the obtained brush was vibrated by a vibrator. Measurements were made in the range of temperature between −20° C. and 60° C. to show the temperature-depending properties of the dissipation factor. The damping properties are satisfactory in practical use when the value of dissipation factor is 0.1 or more at a temperature between 0° C. and at least 40° C.

The life test was carried out as follows with the damping member attached practically to a motor. The dc minimotor was supplied with an initial load. The terminal voltage was applied to the motor in such a way that the motor revolved at 1100 rpm for 5 seconds and 550 rpm for 5 seconds. This cycle was repeated until the motor did not work. This endurance life was evaluated and ranked as follows.

○: very good (endurance life: $5.5\times10^6$ cycles or more)

Δ: good (endurance life: $4.0\times10^5$ - less than $5.5\times10^6$ cycles)

x: poor (endurance life: $4.0\times10^5$ or less cycles)

Adhesion was evaluated and ranked as follows. The sheet of adhesive mass composition was adhered to a SUS304 BA plate by the two-way rolling of a roller of a 2 Kg weight. After the sheet was allowed to stand for 30 minutes, the adhesive power was measured by peeling the sheet at a 180 degree angle at 10 mm/min. speed by use of a tensile strength tester.

◎: excellent (adhesive power: 600g/20mm or more);

○: very good (adhesive power: 350g/20mm - less than 600g/20mm);

Δ: good (adhesive power: 100g/20mm - less than 350g/20mm);

x: poor (adhesive power: less than 100g/20mm).

The punchability was observed to be ranked as follows. Punching was carried out in a rotary process to observe the glue-cleanability and glue squeeze-out.

◎: excellent (Glue-cleanability is satisfactory, and little glue squeeze-out is observed);

⊚: very good (Glue-cleanability is satisfactory but a little glue squeeze-out is observed. The glue squeeze-out has no practical problem).

Δ: good (Glue-cleanability is a little poor, but glue squeeze-out was observed much);

x: poor (Glue-cleanability is poor and punching is difficult).

Total properties were evaluated from life test, adhesive properties and punchability to be ranked as follows.

⊚: very good (Each of life test, adhesion and punchability is higher than the level of "⊚");

Δ: good (Each of life test, adhesion and punchability is higher than the level of "Δ");

x: poor (One of life test, adhesion and punchability shows the level of "x").

All the motors produced in Examples 1–5 displayed high dissipation factor (0.1 or more) in the wide range of temperature (−10° C. –50° C.). The life test, adhesion and punchability were all good.

In comparative Example 6, the dissipation factor has a peak around 0° C. and goes down drastically. The dissipation factor is 0.1 or less at near room temperature at which the motor is usually used. This is because the number of carbons in the alkyl group is small. Therefore, as the vibration-damping ability is lowered, the brush was worn abnormally at a temperature higher than room temperature when used practically in the motor.

In Comparative Example 7, the adhesion between the damping member and the basic brush component is poor, resulting in low dissipation factor of 0.1 or less. This is because the ratio by weight of the acrylic acid is high. Therefore, the vibration of the brush could not be restrained and the brush was abnormally worn.

In Comparative Example 8, the dissipation factor has a peak around 0° C. and goes down drastically as temperature arises. The dissipation factor is 0.1 or less at near room temperature at which the motor is usually used. This is because the ratio by weight of alkyl acrylate is high. Therefore, as vibration-damping ability is lowered, the brush was abnormally worn at a temperature higher than room temperature when used practically in the motor. Further, punchability was poor and processing was difficult.

In Comparative Example 9, the viscoelastic member is formed of general purpose rubber, the dissipation factor has a peak around 0° C. and goes down drastically as temperature arises. The dissipation factor is small or 0.1 or less at high temperature and at low temperature. Therefore, the vibration-damping properties were lowered and the brush was abnormally worn at high temperature and at low temperature when used practically in the motor.

Comparative Example 10

Expanded rubber film of 50 μm thickness was adhered as constraint member to a double-sided adhesive tape available in the market as No. 513 (made by Nitto Denko K.K., rubber-like adhesive mass; paper base). Thus obtained damping member was attached to a minimotor.

FIG. 3 shows a graph of dissipation factor vs. temperature, which was obtained by measuring by use of the conventional damping member obtained above. The conventional damping member shows a high dissipation factor (0.1 or more) around room temperature. But, the dissipation factor becomes small at a high temperature of 40° C. or more and at a low temperature of 0° C. or less. The vibration damping ability of a conventional viscoelastic polymer member, or dependency of dissipation is very high. In practice, the life of the damping member is remarkably lowered at high temperature of 40° C. or more and at low temperature of 0° C. or less, compared with that around room temperature. The remarkable difference of life depending on environmental temperature is a defect.

The waveform of vibration of brush measured at 0°C., 25° C. and 50° C. is shown in FIG. 4,. Because the dissipation factor of the damping member is small in the case of 0° C. and 50° C. compared with the case of 25° C., vibration amplitude of the brush is large and the- damping time becomes long, resulting in that the contact pressure of the brush and the commutator is unstable. In fact, the motor is driven at high temperature and at low temperature, the brush and the commutator were abnormally worn and the life was very short.

What is claimed is:

1. A damping member for a minimotor, comprising:

a brush made of a thin metal plate, a viscoelastic member having a thickness of 50–200 μm on the brush, and a constraint member having a thickness of 20–90 μm on the viscoelastic member, a total thickness of the viscoelastic member and constraint member being within the range between 75–250 μm, the viscoelastic member containing an adhesive mass comprising, 82–92% by weight of alkyl acrylate represented by the general formula of $CH_2{=}CHCOOR$ in which R represents an alkyl group having 8–12 carbon atoms and 8–18% by weight of acrylic acid represented by the chemical formula of $CH_2{=}CHCOOH$, and wherein the damping member has a dissipation factor of 0.1 or more at a temperature between 0°–40°C.

2. A dc minimotor equipped with the damping member of claim 1.

* * * * *